United States Patent [19]
Rarick

[11] Patent Number: 5,963,460
[45] Date of Patent: Oct. 5, 1999

[54] APPARATUS FOR COMPUTING TRANSCENDENTAL FUNCTIONS QUICKLY

[75] Inventor: Leonard D. Rarick, San Marcos, Calif.

[73] Assignee: Metaflow Technologies, Inc., LaJolla, Calif.

[21] Appl. No.: 08/768,781

[22] Filed: Dec. 17, 1996

[51] Int. Cl.[6] .............................. G06F 7/38; G06F 7/50; G06F 7/52

[52] U.S. Cl. .................. 364/748.07; 364/718.01; 364/736.01; 364/736.02; 364/748.01; 364/760.02; 364/786.03; 364/787.01

[58] Field of Search .............................. 364/718.01, 721, 364/722, 723, 716.04, 716.05, 716.07, 736.02, 748.07, 748.14, 787.01, 787.02, 787.03, 787.04, 719, 720, 736.01, 748.01, 748.09, 748.11, 748.13, 754.01, 760.02, 760.04, 786.03

[56] References Cited

U.S. PATENT DOCUMENTS

| | | | |
|---|---|---|---|
| 3,813,529 | 5/1974 | Bartlett | 235/197 |
| 4,075,704 | 2/1978 | O'Leary | 364/748 |
| 4,589,067 | 5/1986 | Porter et al. | 364/748 |
| 4,620,292 | 10/1986 | Hagiwara et al. | 364/748 |
| 4,969,118 | 11/1990 | Montoye et al. | 364/748 |
| 5,497,343 | 3/1996 | Rarick | 364/745 |

OTHER PUBLICATIONS

Montoye et al; Microprocessors: An 18ns 56–Bit Multiply–Add Circuit; Feb. 14, 1990; pp. 46–47, and 262.

*Primary Examiner*—William Grant
*Assistant Examiner*—Navin Natnithithadha
*Attorney, Agent, or Firm*—Law Offices of Steven A. Swernofsky

[57] ABSTRACT

The invention provides a method and system for computing transcendental functions quickly: (1) the multiply ALU is enhanced to add a term to the product, (2) rounding operations for intermediate multiplies are skipped, and (3) the Taylor series is separated into two partial series which are performed in parallel. Transcendental functions with ten terms (e.g., SIN or COS), are thus performed in about ten clock times.

4 Claims, 1 Drawing Sheet

FIG. 1

APPARATUS FOR COMPUTING TRANSCENDENTAL FUNCTIONS QUICKLY

BACKGROUND OF THE INVENTION

1. Field of the Invention

This invention relates to apparatus for computing transcendental functions quickly.

2. Description of Related Art

Computing transcendental functions by Taylor series generally requires one "add" instruction (which might take, for example, three clock times) and one "multiply" instruction (which might also take, for example, three more clock times) for each term. For processors computing transendental functions to significant accuracy, it requires a number of terms to achieve a residual error less than the least significant bit of the answer. In a processor providing a floating point result having a 64-bit fraction, the number of terms is about ten for achieving 64-bit accuracy for the full range of an ordinary Taylor series; if multiply and add operations each take about three clock times, this would take about sixty clock times, which can be a significant amount of time when computation resources are at a premium. To obtain greater accuracy, even more terms and thus even more time would be required.

Accordingly, it would be advantageous to provide a tecnique for computing transcendental functions quickly. This advantage is achieved by apparatus according to the present invention in which terms of a Taylor series are computed in parallel and combined after parallel computation, so as to take only about one sixth of the "natural" amount of time per term.

SUMMARY OF THE INVENTION

The invention provides a method and system for computing transcendental functions quickly. In a preferred embodiment, (1) the multiply arithmetic logic unit (ALU) is enhanced to include the operation of adding a term to the product, (2) rounding operations for intermediate multiply and add operations are skipped, (3) the Taylor series for the transcendental function is separated into two partial series which are performed in parallel, and (4) subtraction and recipricoals, if any, are reserved for the end of the computation. Where appropriate, an alternative Taylor series is used for faster convergence for part of the range of the transcendental function. Thereby, transcendental functions computed using a series with multiple terms (for example, SIN, COS, TAN, ARCTAN, EXP, or LOG), are thus performed in about one sixth of the "natural" amount of time per term, or about one clock time per term in processors in which multiply and add operations each take about three clock times each.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using known techniques for construction of processors, and that modification of processors to implement the process steps and data structures described herein would not require undue invention.

Floating-Point Processing Unit

Figure 1:
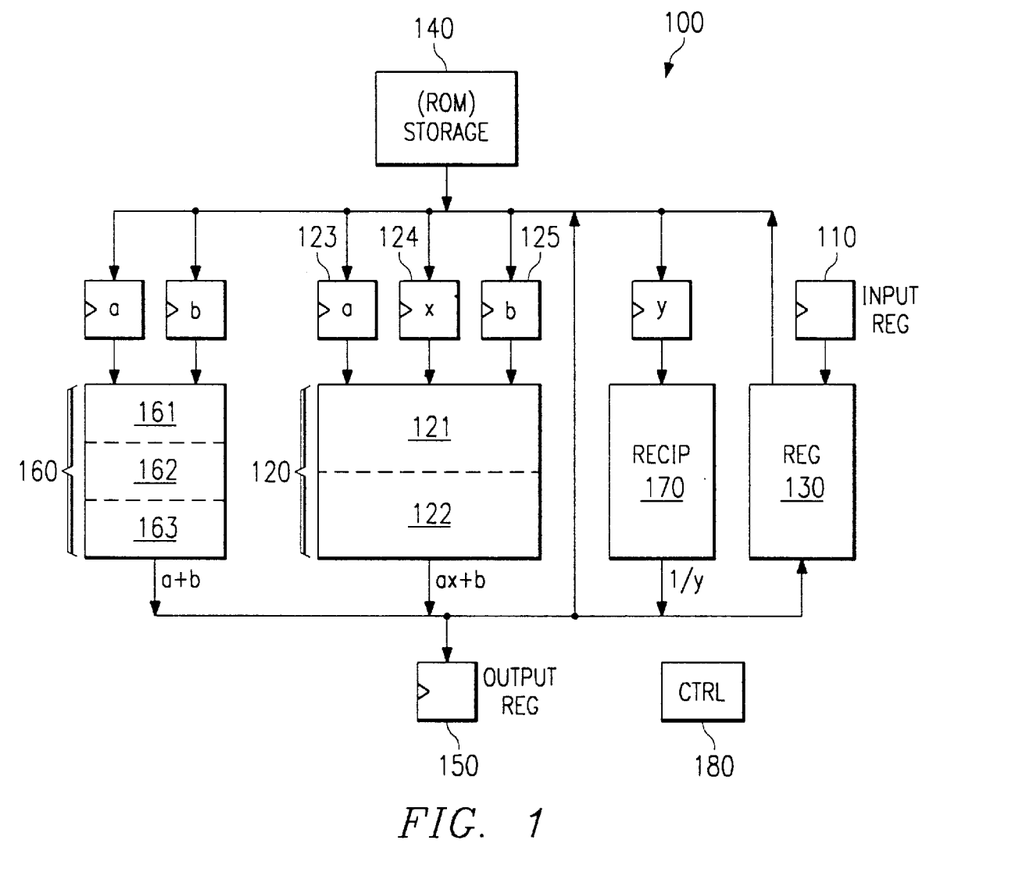
FIG. 1 shows a floating-point processing unit for computing transcendental functions.

FIG. 1 shows a floating-point processing unit for computing transcendental functions.

A floating-point processing unit 100 comprises an input register 110 for receiving an input operand, a multiply-add unit 120 having a first stage 121 and a second stage 122 for performing multiply-add operations in parallel, a register file 130 for storing intermediate values, a storage element 140 for storing constant values used for computing transcendental functions, an output register 150, an adder unit 160 having a first stage 161, a second stage 162, and a third stage 163, a newton element 170 for computing a multiplicative inverse (so as to perform division operations), and a control element 180.

The floating-point processing unit 100 receives an operand at the input register 110, computes a transcendental function, such as a trigonometric function (SIN, COS, TAN, SEC, CSC, or COT), an inverse trigonometric function (ARCSIN, ARCCOS, ARCTAN, ARCSEC, ARCCSC, or ARCCOT), an exponential function (EXP or LN), a hyperbolic trigonometric function (SINH, COSH, TANH, SECH, CSCH, or COTH), or an inverse hyperbolic trigonometric function (ARCSINH, ARCCOSH, ARCTANH, ARCSECH, ARCCSCH, or ARCCOTH), and provides an output value at the output register 150.

In a preferred embodiment, each transcendental function is computed using a Taylor series. Taylor series are known in the art of computing transcendental functions. For example the SIN function can be computed using the following series:

$$\text{SIN} x = x - \frac{1}{3!}x^{\wedge}3 + \frac{1}{5!}x^{\wedge}5 - \frac{1}{7!}x^{\wedge}7 \tag{201}$$

where a^b indicates exponentiation: $a^b$.

Other transcendental functions have known series for computation. See, e.g., STANDARD MATHMATICAL TABLES (20th ed.), page 454 (CRC Press: Cleveland, Ohio, 1972).

In a preferred embodiment, the input register 110, register file 130, storage element 140, the output register 150, and other registers described herein, each comprise 32-bit, 64-bit, or 80-bit registers disposed for storing floating-point numbers stored in a known floating-point numeric format, such as the IEEE standard format for floating-point numbers having one bit for sign, 15 bits for exponent, and 64 bits for mantissa.

The floating-point processing unit 100 operates under control of the control element 180, which directs the flow of data among the elements of the floating-point processing unit 100 using control signals. Control signal paths are omitted from FIG. 1 for clarity.

The register file 130 records intermediate values for computation.

The storage element 140 stores constant values which are used in the computation, such as the values 1/3!, 1/5!, etc. Other and further actual values stored therein will be clear to those skilled in the art after perusal of this application. In a preferred embodiment, the storage element 140 comprises a read-only memory ("ROM") and is addressed by the control element 180 to select those constant values which are needed at selected times during computation.

The multiply-add unit 120 comprises a first input and a first holding register 123 for a first multiplicand, a second input and a second holding register 124 for a second multiplicand, a third input and a third holding register 125 for an addend, and an output. The multiply-add unit 120 multiplies its multiplicands to produce a product, to which it adds its addend to produce its output.

The first stage 121 and the second stage 122 of the multiply-add unit 120 operate independently of each other, with an output of the first stage 121 being coupled to the input of the second stage 122 and with an output of the second stage 122 being coupled to the output of the multiply-add unit 120. Due to pipeline design, the multiply-add unit 120 can therefore conduct two operations simultaneously, one of which is being processed by the first stage 121 and one of which is being processed by the second stage 122.

Pipeline design of circuits is known in the art. Morevoer, in alternative embodiments, the multiply-add unit 120 may comprise more than two pipeline stages (such as for example three, four, five, or more actual pipeline stages), in which cases a first group of its pipeline stages are collectively treated as the first stage 121 and a second group of its pipeline stages are collectively treated as the second stage 122. In a preferred embodiment, the first stage 121 and the second stage 122 take approximately equal amounts of time to perform their functions.

In a preferred embodiment, the multiply-add unit 120 comprises combined multiplier and adder circuits. It is known in the art that multiplication comprises computing partial products and adding those partial products. For example, in a simple design for a multiplier each bit of a first N-bit multiplicand is combined with each bit of a second M-bit multiplicand to produce M×N bits in N M-bit partial products. These N M-bit partial products are added using approximately (N)(M)-(N+M)*2 carry-save adder circuits, followed by a carry look-ahead adder, to produce an M+N bit sum.

The multiply-add unit 120 comprises multiply circuits which compute partial products for its two multiplicands. The addend for the multiply-add unit 120 is additively combined with the partial products when those partial products are added, thus saving time otherwise required for an addition operation.

The multiply-add unit 120 also comprises multiply circuits which omit the operation of rounding. Rounding is omitted in the intermediate stages of computation and is performed only on the final result, thus saving time otherwise required for a rounding operation. In the method of computing Taylor series used in the invention, the early terms of the Taylor series are quite small in comparison to the later terms; thus, computation of the early terms with great accuracy is not needed. Because the multiply-add unit 120 omits the operation of rounding, it comprises only two stages, the first stage 121 and the second stage 122, rather than a third stage which would otherwise be required for the rounding operation.

The series for computing each transcendental function is separated into two partial series, a first partial series and a second partial series. Using a pipeline technique, the first stage 121 computes terms for the first partial series while the second stage 122 computes terms for the second partial series, and the first stage 121 computes terms for the second partial series while the second stage 122 computes terms for the first partial series.

Known implementations of multiply operations take about three clock cycles, one to perform a carry-save addition of the partial products, one to perform a carry-lookahead addition of the results of the carry-save addition operation, and one to round the result. Known implementations of addition operations also take about three clock cycles. By combining the multiply operation and the addition operation into a single multiply-add operation, and by omitting the rounding operation, only two clock cycles are required to perform operations otherwise requiring six clock cycles. Similar time savings are achieved in cases where multiply operations or addition operations take a larger or smaller number of clock cycles.

By separating the series for computing each transcendental function into two partial series, only about eleven clock cycles are required to compute ten terms of the series (two clock cycles for each of five pairs of terms, offset by one clock cycle for the second stage of each multiply-add operation, with possibly one or two extra clock cycles needed to perform rounding or using the adder unit 160).

Method of Computation

The method of computation uses a reformulated series for computing each transcendental function.

Let x0, x1, x2, and x3, be defined as shown in equations 210, 211, 212, and 213:

$$x0 = 1 + \frac{x^4}{4!} + \frac{x^8}{8!} + \frac{x^{12}}{12!} + \frac{x^{16}}{16!} \quad (210)$$

$$x1 = x + \frac{x^5}{5!} + \frac{x^9}{9!} + \frac{x^{13}}{13!} + \frac{x^{17}}{17!} \quad (211)$$

$$x2 = \frac{x^2}{2!} + \frac{x^6}{6!} + \frac{x^{10}}{10!} + \frac{x^{14}}{14!} + \frac{x^{18}}{18!} \quad (212)$$

$$x3 = \frac{x^3}{3!} + \frac{x^7}{7!} + \frac{x^{11}}{11!} + \frac{x^{15}}{15!} + \frac{x^{19}}{19!} \quad (213)$$

Known Taylor series may be computed using these partial series as follows:

$$\text{COS } x = x0 - x2 \quad (220)$$

$$\text{SIN } x = x1 - x3 \quad (221)$$

(For COS x and SIN x, negative terms have been segregated. Each of the subsequences x0, x1, x2, and x3, requires only addition, not subtraction, for its individual computation.)

$$\text{COSH } x = x0 + x2 \quad (222)$$

$$\text{SINH } x = x1 + x3 \quad (223)$$

$$\text{EXP } x = x0 + x1 + x2 + x3 \quad (224)$$

$$\text{TAN } x = \frac{\text{SIN } x}{\text{COS } x} \quad (225)$$

$$\text{TANH } x = \frac{\text{SINH } x}{\text{COSH } x} \quad (226)$$

The series x0, x1, x2, and x3 have only finite length because they converge, within the limits of roundoff error for the floating-point representation used for the processor, to accurate values for the transcendental functions. The particular equations shown herein are exemplary; those skilled in the art would recognize, after perusal of this application, that other and similar equations with different but still finite lengths would be required for computations with different required accuracy.

Each of the series x0, x1, x2, and x3 may be reformulated as follows, by setting y=x^4:

$$x0 = 1 + \left(\frac{1}{4!} + \left(\frac{1}{8!} + \left(\frac{1}{12!} + \frac{y}{16!}\right)y\right)y\right)y \quad (230)$$

$$x1 = \left(1 + \left(\frac{1}{5!} + \left(\frac{1}{9!} + \left(\frac{1}{13!} + \frac{y}{17!}\right)y\right)y\right)y\right)x \quad (231)$$

$$x2 = \left(\frac{1}{2!} + \left(\frac{1}{6!} + \left(\frac{1}{10!} + \left(\frac{1}{14!} + \frac{y}{18!}\right)y\right)y\right)y\right)x^2 \quad (232)$$

$$x3 = \left(\frac{1}{3!} + \left(\frac{1}{7!} + \left(\frac{1}{11!} + \left(\frac{1}{15!} + \frac{y}{19!}\right)y\right)y\right)y\right)x^3 \quad (233)$$

After such reformulation, each of the series x0, x1, x2, and x3 may be computed using pipeline techniques.

For example, the function sin(x) may be computed as shown in table 2-1.

The column labeled "clock" indicates the clock cycle on which the described operation is performed.

The column labeled "mul 1" indicates an operation performed by the first stage 121 of the floating-point multiply-add unit 120. Similarly, the column labeled "mul 2" indicates an operation performed by the second stage 122 of the floating-point multiply-add unit 120. Since each multiply-add operation requires two clock cycles, each operation which appears in the column labeled "mul 1" always appears in the next clock cycle in the column labeled "mul 2".

Some clock cycles indicate computation of powers of x (the input operand), specifically x^2, x^4, and x^3. These are computed by multiplication. Thus, x^2 is computed as (x) times (x), x^4 is computed as (x^2) times (x^2), and x^3 is computed as (x) times (x^2).

The equals sign indicates a name given to an output; outputs are routed to a register in the register file 130 for storage, or can be routed to one of the multiplicand holding registers 123 or 124 of the multiply-add unit 120, for further computation. Data in the registers is indicated by names such as "a", "b", "c", "d", "e", "f", "g", "h", "i", and "j"; these names can be reused in the table for different values. Routing directly to one of the multiplicand holding registers 123 or 124 is indicated by the names "p" and "q"; these names are not reused in the table for different values and typically indicate a value having that name in an indicated Taylor series. Original input is indicated by the name "x".

The column labeled "add 1" indicates an operation performed by the first stage 161 of the adder unit 160. Similarly, the column labeled "add 2" indicates an operation performed by the second stage 162 of the adder unit 160, and the column labeled "add 3" indicates an operation performed by the third stage 163 of the adder unit 160. Since each addition operation for the adder unit 160 requires three clock cycles, each operation which appears in the column labeled "add 1" always appears in the next clock cycle in the column labeled "add 2" and in the following clock cycle in the column labeled "add 3".

The column labeled "control" indicates an operation directed by the control unit 180. The operation "read rom" means to read a value from the storage element 150, which may comprise a read-only memory ("ROM"). The value 1.0 may also be supplied to the multiply-add unit 120 from the ROM, or may be generated internally in the first stage 121.

As shown in table 2-1, it takes a total of about 18 clock cycles to compute a 10-term Taylor series. This series converges to sufficient accuracy for values of the input argument |x| <pi/4.

The function cos(x) may be computed in a similar manner as shown in table 2-2.

The two functions sin(x) and cos(x) may also be computed together in a single operation, in a similar manner, as shown in table 2-3.

The function tan(x) may be computed in a similar manner as shown in table 2-4. The function TAN x uses computation of a multiplicative inverse.

The column labeled "newton" indicates operation of the newton element 170. The value in parentheses indicates the number of bits of accuracy being computed. A greater number of bits of accuracy requires more time.

Other transcendental functions are implemented in a similar manner.

The functions COSH x, SINH x, and TANH x are computed in a similar manner as COS x, SIN x, and TAN x, except that the different subseries are added instead of subtracted, as shown in equations 222, 223, and 226, respectively.

The function EXP x is computed in a similar manner as COS x or SIN x, except that subseries are used as shown in equation 224.

Certain other transcendental functions require different series for computation.

A function (2^x)−1 is desirable in part because it is used in the instruction set for a commonly-used machine language, and in part because the Taylor series for this function converges relatively quickly. This function is computed for values of its input argument (x) between −1 and +1. To compute the function for values of its input argument (x) outside this range, it is only necessary to adjust the exponent of (x) to fit within this range and to adjust the exponent of the computed result to compensate.

To compute (2^x)−1, for −1<(x)<1, let p, q, r, and s be defined as shown in equations 241, 242, 243, and 244, respectively.

$$p = x \, ln(2) \quad (241)$$

$$q = (x \, ln(2))^2 \quad (242)$$

$$r = 1 + \frac{q^2}{2!} + \frac{q^4}{4!} + \frac{q^6}{6!} + \quad (243)$$
$$\frac{q^8}{8!} + \frac{q^{10}}{10!} + \frac{q^{12}}{12!} + \frac{q^{14}}{14!} + \frac{q^{16}}{16!} + \frac{q^{18}}{18!}$$

$$s = 2 + \frac{q^3}{3!} + \frac{q^5}{5!} + \frac{q^7}{7!} + \quad (244)$$
$$\frac{q^9}{9!} + \frac{q^{11}}{11!} + \frac{q^{13}}{13!} + \frac{q^{15}}{15!} + \frac{q^{17}}{17!} + \frac{q^{19}}{19!}$$

The function (2^x)−1 may be computed using these partial series as follows:

$$(2^x)-1 = r+s. \quad (245)$$

Similar to the series x0, x1, x2, and x3, the series r and s have only finite length because they converge, within the limits of roundoff error for the floating-point representation used for the processor, to accurate values for the transcendental functions.

Each of the series r and s may be reformulated as follows:

$$r = \left(\frac{1}{2!} + \left(\frac{1}{4!} + \left(\frac{1}{6!} + \left(\frac{1}{8!} + \left(\frac{1}{10!} + \left(\frac{1}{12!} + \left(\frac{1}{14!} + \left(\frac{1}{16!} + \frac{p}{18!}\right)p\right)p\right)p\right)p\right)p\right)p\right)p\right)p \quad (251)$$

$$s = \left(1 + \left(\frac{1}{3!} + \left(\frac{1}{5!} + \left(\frac{1}{7!} + \left(\frac{1}{9!} + \left(\frac{1}{11!} + \left(\frac{1}{13!} + \left(\frac{1}{15!} + \left(\frac{1}{17!} + \frac{p}{19!}\right)p\right)p\right)p\right)p\right)p\right)p\right)p\right)p\right)q \quad (252)$$

The function $(2^x)-1$ may therefore be computed as shown in table 2-5.

For the function ARCTAN x, the usual Taylor series is shown in equation 261:

$$\text{ARCTAN}\, x = x - \frac{x^3}{3} + \frac{x^5}{5} - \frac{x^7}{7} + \frac{x^9}{9} \quad (261)$$

Let y0 and y1 be defined as shown in equations 262 and 263, respectively:

$$y0 = 1 + \left(\frac{1}{5} + \left(\frac{1}{9} + \left(\frac{1}{13} + \left(\frac{1}{17} + \right.\right.\right.\right. \quad (262)$$
$$\left(\frac{1}{21} + \left(\frac{1}{25} + \left(\frac{1}{29} + \left(\frac{1}{33} + \left(\frac{1}{37} + \frac{1}{41} + \left(\frac{1}{45} + \left(\frac{1}{49} + \left(\frac{1}{53} + \left(\frac{1}{57} + \left(\frac{1}{61} + \left(\frac{1}{65} + \right.\right.\right.\right.\right.\right.\right.\right.\right.\right.\right.$$
$$\left(\frac{1}{69} + \frac{p}{73}\right)p\,)p\,)p\,)p\,)p\,)p\,)p\,)p\,)p\,)p\,)p\,)p\,)p\,)p\,)p$$

$$y1 = \frac{1}{3} + \left(\frac{1}{7} + \left(\frac{1}{11} + \left(\frac{1}{15} + \left(\frac{1}{19} + \left(\frac{1}{23} + \left(\frac{1}{27} + \left(\frac{1}{31} + \left(\frac{1}{35} + \frac{1}{39} + \left(\frac{1}{43} + \left(\frac{1}{47} + \left(\frac{1}{51} + \left(\frac{1}{55} + \left(\frac{1}{59} + \left(\frac{1}{63} + \right.\right.\right.\right.\right.\right.\right.\right.\right.\right.\right.\right.\right.\right.\right. \quad (263)$$
$$\left(\frac{1}{67} + \frac{p}{71}\right)p\,)p\,)p\,)p\,)p\,)p\,)p\,)p\,)p\,)p\,)p\,)p\,)p\,)p\,)p$$

The known Taylor series may be computed using these partial series as follows:

$$\text{ARCTAN}\, x = (y0)(x) - (y1)(x^3) \quad (264)$$

where $p = x^4$.

This series converges fast enough for rapid computation when $0 < x < 1/r$, where $r = \text{sqrt}(3)$, the square root of 3. Accordingly, the function arctan(x) may be computed as shown in table 2-6, for values of the input operand x falling within $0 < x < 1/\text{sqrt}(3)$.

However, when $1/r < x < 1$, another series for ARCTAN x is preferred for faster convergence.

$$\text{ARCTAN}\, x = \frac{pi}{6} + \quad (265)$$
$$\frac{r}{2}\left(\frac{y}{1} - \frac{y^2}{2} + \frac{y^4}{4} - \frac{y^5}{5} + \frac{y^7}{7} - \frac{y^8}{8} + \frac{y^{10}}{10} - \frac{y^{11}}{11}\ldots\right)$$

$$y = \frac{r}{2}\left(x - \frac{1}{r}\right)$$

Let w1 and w2 be defined as shown in equations 266 and 267, respectively:

where $q = y^3$.

The series of equation 265 may be computed using these partial series as follows:

$$\text{ARCTAN}\, x = \frac{pi}{6} + (w1)\left(y - \frac{r}{2}\right) - (w1)\left(y^2\,2\frac{r}{2}\right) \quad (268)$$

This equation 268 is computed as shown in table 2-7.

For values of the input operand $x > 1$, arc-tan(x) may be computed by inverting the input operand x and using the equivalence ARCTAN $(x) = (pi/2) - \text{ARCTAN}\,(1x)$. Similarly, for values of the input operand $x < 0$, arctan(x) may be computed by using the equivalence ARCTAN $(-x) = -(\text{ARCTAN}\, x)$.

The function lg(x), the logarithm of x base 2, is another transcendental function which can be determined using a series.

The input argument, (x), is expressed as $(p)(2^q)$, where q is an integer and $11/16 < p < 23/16$; the integer q might be positive, zero, or negative. These limits for the parameter (p) are selected because they are similar to the range $$-\left(1 - \frac{\text{sqrt}(2)}{2}\right) < x < \text{sqrt}(2) - 1 \quad (269)$$

Then, $$\lg x = q + \lg p$$
$$= q + \frac{\ln p}{\ln 2}$$
$$\approx q + 1.442695 \ln p$$

where ln(p) is the natural logarithm of p.

Then $\ln(p) = 2\,(U+V)$, where U and V are determined as in equations 271 and 272 respectively.

$$w0 = 1 + \left(\frac{1}{4} + \left(\frac{1}{7} + \left(\frac{1}{10} + \left(\frac{1}{13} + \left(\frac{1}{16} + \left(\frac{1}{19} + \left(\frac{1}{22} + \left(\frac{1}{25} + \left(\frac{1}{28} + \frac{1}{31} + \left(\frac{1}{34} + \left(\frac{1}{37} + \left(\frac{1}{40} + \left(\frac{1}{43} + \frac{q}{46}\right)q\,\right)q\,\right)q\,\right)q\,\right)q\,\right)q\,\right)q\,\right)q\,\right)q\,\right)q\,\right)q\,\right)q\,\right)q \quad (266)$$

$$w1 = \frac{1}{2} + \left(\frac{1}{5} + \left(\frac{1}{8} + \left(\frac{1}{11} + \left(\frac{1}{14} + \left(\frac{1}{17} + \left(\frac{1}{20} + \left(\frac{1}{23} + \left(\frac{1}{26} + \frac{1}{29} + \left(\frac{1}{32} + \left(\frac{1}{35} + \left(\frac{1}{38} + \left(\frac{1}{41} + \left(\frac{1}{44} + \frac{q}{47}\right)q\,\right)q\,\right)q\,\right)q\,\right)q\,\right)q\,\right)q\,\right)q\,\right)q\,\right)q\,\right)q\,\right)q\,\right)q \quad (267)$$

$$U = r + \frac{r^5}{5} + \frac{r^9}{9} + \frac{r^{13}}{13} + \frac{r^{17}}{17} + \frac{r^{21}}{21} + \frac{r^{25}}{25}$$

$$= \left(1 + \left(\frac{1}{5} + \left(\frac{1}{9} + \left(\frac{1}{13} + \left(\frac{1}{17} + \left(\frac{1}{21} + \frac{t}{25}\right)t\right)t\right)t\right)t\right)t\right)r$$

$$r = \frac{p-1}{p+1} \text{ and } t = r^4. \tag{271}$$

$$V = \frac{r^3}{3} + \frac{r^7}{7} + \frac{r^{11}}{11} + \frac{r^{15}}{15} + \frac{r^{19}}{19} + \frac{r^{23}}{23}$$

$$= \left(\frac{1}{3} + \left(\frac{1}{7} + \left(\frac{1}{11} + \left(\frac{1}{15} + \left(\frac{1}{19} + \frac{t}{23}\right)t\right)t\right)t\right)t\right)r^3$$

where r and t are defined as in equation 271. (272)

The function lg(x) may therefore be computed as shown in table 2-8, for values of the input operand x>zero. The function lg(x) is not defined for values of the input operand x<zero.

For the function ln(x+1), the usual Taylor series is shown in equation 281:

$$\ln(x+1) = x - \frac{x^2}{2} + \frac{x^3}{3} - \frac{x^4}{4} \tag{281}$$

Let U and V be defined as shown in equations 282 and 283, respectively:

$$U = x + \frac{x^3}{3} + \frac{x^5}{5} + \frac{x^7}{7} + \frac{x^9}{9} + \frac{x^{11}}{11} + \frac{x^{13}}{13} + \frac{x^{15}}{15} +$$

$$\frac{x^{17}}{17} + \frac{x^{19}}{19} + \frac{x^{21}}{21} + \frac{x^{23}}{23} + \frac{x^{25}}{25} + \frac{x^{27}}{27} + \frac{x^{29}}{29}$$

$$= \left(1 + \frac{1}{3} + \left(\frac{1}{5} + \left(\frac{1}{7} + \left(\frac{1}{9} + \left(\frac{1}{11} + \left(\frac{1}{13} + \left(\frac{1}{15} + \left(\frac{1}{17} + \left(\frac{1}{19} + \frac{1}{21}\right.\right.\right.\right.\right.\right.\right.\right.\right.$$

$$+ \left(\frac{1}{23} + \left(\frac{1}{25} + \left(\frac{1}{27} + \frac{1}{29}\right)p\right)p\right)p\right)p\bigg)p\bigg)p\bigg)p\bigg)p\bigg)p\bigg)p\bigg)p\bigg)p$$

where p=x^2. (282)

$$V = \frac{x^2}{2} + \frac{x^4}{4} + \frac{x^6}{6} + \frac{x^8}{8} + \frac{x^{10}}{10} + \frac{x^{12}}{12} + \frac{x^{14}}{14} + \frac{x^{16}}{16} +$$

$$\frac{x^{18}}{18} + \frac{x^{20}}{20} + \frac{x^{22}}{22} + \frac{x^{24}}{24} + \frac{x^{26}}{26} + \frac{x^{28}}{28} + \frac{x^{30}}{30}$$

$$= \left(\frac{1}{2} + \left(\frac{1}{4} + \left(\frac{1}{6} + \left(\frac{1}{8} + \left(\frac{1}{10} + \left(\frac{1}{12} + \left(\frac{1}{14} + \left(\frac{1}{16} + \left(\frac{1}{18} + \left(\frac{1}{20} + \frac{1}{22}\right.\right.\right.\right.\right.\right.\right.\right.\right.\right.$$

$$+ \left(\frac{1}{24} + \left(\frac{1}{26} + \left(\frac{1}{28} + \frac{p}{30}\right)p\right)p\right)p\bigg)p\bigg)p\bigg)p\bigg)p\bigg)p\bigg)p\bigg)p\bigg)p\bigg)p$$

where p=x^2. (283)

Then $\ln(x+1) = U - V$. This series converges for values of the input argument x<1/4, and (x) falling within the range (1/sqrt(2))−1<x<sqrt(2)−1. Note that for x<1/4, it is desirable not to add values to x, because loss of precision will result.

$$lg(x+1) = \frac{\ln(x+1)}{\ln(2)} \approx 1.442695\ln(x+1). \tag{284}$$

The function lg(x+1) may therfore be computed as shown in table 2-10, for values of the input operand x>1/4.

Unlike the method of determining lg(x+1) described with reference to table 2-8, when x>1/4, it is feasible when x>1/4 to add values to x, because loss of precision is not as strong a consideration.

Let U and V be defined as in equations 291 and 292.

$$U = r + \frac{r^5}{5} + \frac{r^9}{9} + \frac{r^{13}}{13} + \frac{r^{17}}{17} + \frac{r^{21}}{21} + \frac{r^{25}}{25}$$

$$= \left(1 + \left(\frac{1}{5} + \left(\frac{1}{9} + \left(\frac{1}{13} + \left(\frac{1}{17} + \left(\frac{1}{21} + \frac{t}{25}\right)t\right)t\right)t\right)t\right)t\right)r$$

$$r = \frac{x}{x+2} \text{ and } t = r^4. \tag{291}$$

$$V = \frac{r^3}{3} + \frac{r^7}{7} + \frac{r^{11}}{11} + \frac{r^{15}}{15} + \frac{r^{19}}{19} + \frac{r^{23}}{23}$$

$$= \left(\frac{1}{3} + \left(\frac{1}{7} + \left(\frac{1}{11} + \left(\frac{1}{15} + \left(\frac{1}{19} + \frac{t}{23}\right)t\right)t\right)t\right)t\right)r^3$$

where r and t are defined as in equation 291. (292)

Then $\ln(x+1) = 2(U+V)$. This series converges for values of the input argument (x) falling within the range (1/sqrt(2))−1<x<sqrt(2)−1.

The function lg(x+1) may therefore be computed as shown in table 2-9, for values of the input operand x<1/4, and in table 2-10, for values of the input operand x>1/4.

Simulation and Experimental Results

Table 3-1 shows a set of experimental latency times for computing transcendental functions, comparing latency times for a processor including a floating-point unit according to the invention with the "Pentium" processor available from Intel Corporation of Santa Clara, Calif. As shown in table 3-1, the floating-point unit according to the invention is in most cases much faster than the Pentium processor.

The column labeled "instruction" indicates the type of instruction which was tested.

The columns labeled "latency" shows the latency times, in clock cycles, for each type of processor. The two numbers shown are the lower and upper bounds for latency.

The column labeled "difference" shows the additional time required by the Pentium processor, in comparison with the floating-point unit according to the invention.

TABLE 3-1

| Instruction | latency (Pentium) | latency (invention) | difference |
|---|---|---|---|
| (2**x) − 1 | 54 . . . 60 | 54 . . . 54 | 0 |
| cos(x) | 59 . . . 126 | 34 . . . 66 | 25 |
| sin(x) | 59 . . . 126 | 36 . . . 66 | 23 |
| sin(x) & cos(x) | 83 . . . 138 | 54 . . . 84 | 29 |
| arctan (x) | 98 . . . 137 | 96 . . . 116 | 2 |
| tan(x) | 115 . . . 174 | 60 . . . 90 | 55 |

TABLE 3-1-continued

| Instruction | latency (Pentium) | latency (invention) | difference |
|---|---|---|---|
| lg(x) | 104 ... 114 | 70 ... 70 | 34 |
| lg(x + 1) | 103 ... 106 | 76 ... 78 | 27 |

Other transcendental functions also have time savings.

Alternative Embodiments

Although preferred embodiments are disclosed herein, many variations are possible which remain within the concept, scope, and spirit of the invention, and these variations would become clear to those skilled in the art after perusal of this application.

TABLE 2-1

Implementation of Sin(x) for |x| < pi/4

| clock | mul1 | mul2 | newton | add1 | add2 | add3 | control |
|---|---|---|---|---|---|---|---|
| 1 | x*x | | | | | | |
| 2 | | x*x | | | | | read rom for 1/19! = a |
| 3 | x**4 | | | | | | read rom for 1/17! = b |
| 4 | x3 | x4 = p | | | | | read rom for 1/15! = c |
| 5 | ap + c | x**3 = q | | | | | read rom for 1/13! = d |
| 6 | bp + d | ap + c = r | | | | | read rom for 1/11! = e |
| 7 | rp + e | bp + d = s | | | | | read rom for 1/9! = f |
| 8 | sp + f | rp + e = t | | | | | read rom for 1/7! = g |
| 9 | tp + g | sp + f = u | | | | | read rom for 1/5! = h |
| 10 | up + h | tp + g = v | | | | | read rom for 1/3! = i |
| 11 | vp + i | up + h = w | | | | | |
| 12 | wp + l | vp + i = m | | | | | |
| 13 | mq | wp + l = n | | | | | |
| 14 | nx | mq | | | | | |
| 15 | | nx | | | | | |
| 16 | | | | nx−mq | | | |
| 17 | | | | | nx−mq | | |
| 18 | | | | | | nx−mq => output, change sign if needed | |

TABLE 2-2

Implementation of Cos(x) for |x| < Pi/4

| clock | mul1 | mul2 | newton | add1 | add2 | add3 | control |
|---|---|---|---|---|---|---|---|
| 1 | x*x | | | | | | |
| 2 | | x*x = q | | | | | read rom for 1/18! = a |
| 3 | x**4 | | | | | | read rom for 1/16! = b |
| 4 | | x**4 =0 p | | | | | read rom for 1/14! = c |
| 5 | ap + c | | | | | | read rom for 1/12! = d |
| 6 | bp + d | ap + c = r | | | | | read rom for 1/10! = e |
| 7 | rp + e | bp + d = s | | | | | read rom for 1/8! = f |
| 8 | sp + f | rp + e = t | | | | | read rom for 1/6! = g |
| 9 | tp + g | sp + f = u | | | | | read rom for 1/4! = h |
| 10 | up + h | tp + g = v | | | | | read rom for 1/2! = i |
| 11 | vp + i | up + h = w | | | | | |
| 12 | wp + l | vp + i = m | | | | | |
| 13 | mq | wp + l = n | | | | | |
| 14 | | mq | | | | | |
| 15 | | | | n − mq | | | |
| 16 | | | | | n − mq | | |
| 17 | | | | | | n − mq => output | |

TABLE 2-3

Implementation of SinCos(x) for |x| < pi/4

| clock | mul1 | mul2 | newton | add1 | add2 | add3 | control |
|---|---|---|---|---|---|---|---|
| 1 | x*x | | | | | | |
| 2 | | x*x = q | | | | | read rom for 1/18! = a |
| 3 | x**4 | | | | | | read rom for 1/16! = b |
| 4 | x3 | x4 = p | | | | | read rom for 1/14! = c |
| 5 | ap + c | z**3 = z | | | | | read rom for 1/12! = d |
| 6 | bp + d | ap + c = r | | | | | read rom for 1/10! = e |
| 7 | rp + e | bp + d = s | | | | | read rom for 1/8! = f |
| 8 | sp + f | rp + e = t | | | | | read rom for 1/6! = g |
| 9 | tp + g | sp + f = u | | | | | read raa for 1/4! = h |
| 10 | up + h | tp + g = v | | | | | read rom for 1/2! = i |
| 11 | vp + i | np + h = w | | | | | read rom for 1/19! = a |
| 12 | wp + l | vp + i = m | | | | | read rom for 1/17! = b |
| 13 | mq | wp + l = n | | | | | read rom for 1/15! = c |
| 14 | ap + c | mq | | | | | read rom for 1/13! = d |
| 15 | bp + d | ap + c = r | | n − mq | | | read rom for 1/11! = e |
| 16 | rp + e | bp + d = s | | | n − mq | | read rom for 1/9! = f |
| 17 | sp + f | rp + e = t | | | | n − mq => | output cos(x) |
| | | | | | | | read rom for 1/7! = g |
| 18 | tp + g | sp + f = u | | | | | read rom for 1/5! = h |
| 19 | up + h | tp + g = v | | | | | read rom for 1/3! = i |
| 20 | vp + i | up + h = w | | | | | |
| 21 | vp + l | vp + i = m | | | | | |
| 22 | mz | vp + l = n | | | | | |
| 23 | nx | mz | | | | | |
| 24 | | nx | | | | | |
| 25 | | | | nx − mz | | | |
| 26 | | | | | nx − mz | | |
| 27 | | | | | | nx − mz => | output sin(x), change sign if needed |

TABLE 2-4

Implementation of Tan(x) for |x| < pi/4

| Clock | mul1 | mul2 | newton | add1 | add2 | add3 | control |
|---|---|---|---|---|---|---|---|
| 1 | x*x | | | | | | |
| 2 | | x*x = q | | | | | read rom for 1/18! = a |
| 3 | x**4 | | | | | | read rom for 1/16! = b |
| 4 | x3 | x4 = p | | | | | read rom for 1/14! = c |
| 5 | ap + c | x**3 = z | | | | | read rom for 1/12! = d |
| 6 | bp + d | ap + c = r | | | | | read rom for 1/10! = e |
| 7 | rp + e | bp + d = s | | | | | read rom for 1/8! = f |
| 8 | sp + f | rp + e = t | | | | | read rom for 1/6! = g |
| 9 | tp + g | sp + f = u | | | | | read rom for 1/4! = h |
| 10 | up + h | tp + g = v | | | | | read rom for 1/2! = i |
| 11 | vp + i | up + h = w | | | | | read rom for 1/19! = a |
| 12 | vp + l | vp + i = m | | | | | read rom for 1/17! = b |
| 13 | mq | wp + l = n | | | | | read rom for 1/15! = c |
| 14 | ap + c | mq | | | | | read rom for 1/13! = d |
| 15 | bp + d | ap + c = r | | n − mq | | | read rom for 1/11! = e |
| 16 | rp + e | bp + d = s | | | n − mq | | read rom for 1/9! = f |
| 17 | sp + f | rp + e = t | | | | n − mq = a | Represent 1/a as b |
| | | | | | | | read rom for 1/7! = g |
| 18 | tp + g | sp + f = u | b(9) | | | | read rom for 1/5! = h |
| 19 | up + h | tp + g = v | b(18) | | | | read rom for 1/3! = i |
| 20 | vp + i | np + h = w | b(36) | | | | |
| 21 | wp + l | vp + i = m | b(36) | | | | |
| 22 | mz | wp + 1 = n | b(66) | | | | |
| 23 | nx | mz | b(66) | | | | |
| 24 | | nx | b(66) | | | | |
| 25 | | | b(66) | nx − mz | | | |
| 26 | | | | | nx − mz | | |
| 27 | | | | | | nx − mz = c | |
| 28 | c*b(66) | | | | | | |
| 29 | | c*b(66) | | | | | |
| 30 | | | c*b(66) in mul3 => output | | | | |

TABLE 2-5

Implementation of $(2^{**}x)$ – for $|x| < 1.0$
The first clock of all transcendental functions is used by the control
logic to determine which transcendental is to be executed and what range
the input is in. $x^*x$ is performed in the multiply unit in case it can
be used. Also, the rom is read in both clock 0 and clock 1, obtaining
the values of $\ln(2)^{**}2$ and $\ln(2)$ in case they can be used.

| clock | mul1 | mul2 | newton | add1 | add2 | add3 | control |
|---|---|---|---|---|---|---|---|
| 0 |  |  |  |  |  |  | read rom for ln(2) |
| 1 | x*x |  |  |  |  |  | read rom for ln(2)**2 = y |
| 2 | x*ln(2) | x*x |  |  |  |  | read rom for 1/19! = a |
| 3 | x**2*y | x*ln(2) = q |  |  |  |  | read rom for 1/18! = b |
| 4 |  | x**2*y = p |  |  |  |  | read rom for 1/17! = c |
| 5 | ap + c |  |  |  |  |  | read rom for 1/16! = d |
| 6 | bp + d | ap + c = r |  |  |  |  | read rom for 1/15! = e |
| 7 | rp + e | bp + d = s |  |  |  |  | read rom for 1/14! = f |
| 8 | sp + f | rp + e = t |  |  |  |  | read rom for 1/13! = g |
| 9 | tp + g | sp + f = u |  |  |  |  | read rom for 1/12! = h |
| 10 | up + h | tp + g = v |  |  |  |  | read rom for 1/11! = i |
| 11 | vp + i | up + h = w |  |  |  |  | read rom for 1/10! = a |
| 12 | wp + a | vp + i = z |  |  |  |  | read rom for 1/9! = b |
| 13 | xp + b | wp + a = r |  |  |  |  | read rom for 1/8! = c |
| 14 | rp + c | zp + b = a |  |  |  |  | read rom for 1/7! = d |
| 15 | sp + d | rp + c = t |  |  |  |  | read rom for 1/6! = e |
| 16 | tp + e | sp + d = u |  |  |  |  | read rom for 1/5! = g |
| 17 | up + f | tp + e = v |  |  |  |  | read rom for 1/4! = g |
| 18 | vp + g | up + f = w |  |  |  |  | read rom for 1/3! = h |
| 19 | wp + h | vp + g = z |  |  |  |  | read rom for 1/2! = i |
| 20 | zp + i | wp + h = r |  |  |  |  |  |
| 21 | rp + l | zp + i = m |  |  |  |  |  |
| 22 | mp | rp + l = n |  |  |  |  |  |
| 23 | nq | mp |  |  |  |  |  |
| 24 |  | nq |  |  |  |  |  |
| 25 |  |  |  | mp + nq |  |  |  |
| 26 |  |  |  |  | mp + nq |  |  |
| 27 |  |  |  |  |  | mp + nq => output |  |

TABLE 2-6

Implementation of ArcTan(x) for $|x| < 1/$the square root of 3

| clock | mul1 | mul2 | newton | add1 | add2 | add3 | control |
|---|---|---|---|---|---|---|---|
| 1 | x*x |  |  |  |  |  |  |
| 2 |  | x*x |  |  |  |  | read rom for 1/73 = a |
| 3 | x**4 |  |  |  |  |  | read rom for 1/71 = b |
| 4 | \|x3\| | x4 = p |  |  |  |  | read rom for 1/69 = c |
| 5 | ap + c | \|x**3\| = q |  |  |  |  | read rom for 1/67 = d |
| 6 | bp + d | ap + c = r |  |  |  |  | read rom for 1/65 = e |
| 7 | rp + e | bp + d = s |  |  |  |  | read rom for 1/63 = f |
| 8 | sp + f | rp + e = t |  |  |  |  | read rom for 1/61 = g |
| 9 | tp + g | dp + f = u |  |  |  |  | read rom for 1/59 = h |
| 10 | up + h | tp + g = v |  |  |  |  | read rom for 1/57 = i |
| 11 | vp + i | up + h = w |  |  |  |  | read rom for 1/55 = j |
| 12 | wp + j | vp + i = m |  |  |  |  | read rom for 1/53 = a |
| 13 | mp + a | wp + j = n |  |  |  |  | read rom for 1/51 = b |
| 14 | np + b | mp + a = r |  |  |  |  | read rom for 1/49 = c |
| 15 | rp + c | np + b = s |  |  |  |  | read rom for 1/47 = d |
| 16 | sp + d | rp + c = t |  |  |  |  | read rom for 1/45 = e |
| 17 | tp + e | sp + d = u |  |  |  |  | read rom for 1/43 = f |
| 18 | up + f | tp + e = v |  |  |  |  | read rom for 1/41 = g |
| 19 | vp + g | up + f = w |  |  |  |  | read rom for 1/39 = h |
| 20 | wp + h | vp + g = m |  |  |  |  | read rom for 1/37 = i |
| 21 | mp + i | wp + h = n |  |  |  |  | read rom for 1/35 = j |
| 22 | np + j | mp + i = r |  |  |  |  | read rom for 1/33 = a |
| 23 | rp + a | np + j = s |  |  |  |  | read rom for 1/31 = b |
| 24 | sp + b | rp + a = r |  |  |  |  | read rom for 1/29 = c |
| 25 | tp + c | sp + b = u |  |  |  |  | read rom for 1/27 = d |
| 26 | up + d | tp + c = v |  |  |  |  | read rom for 1/25 = e |
| 27 | vp + e | up + d = w |  |  |  |  | read rom for 1/23 = f |
| 28 | wp + f | vp + e = m |  |  |  |  | read rom for 1/21 = g |
| 29 | mp + g | wp + f = n |  |  |  |  | read rom for 1/19 = h |
| 30 | np + h | mp + g = r |  |  |  |  | read rom for 1/17 = i |

TABLE 2-6-continued

Implementation of ArcTan(x) for |x| < 1/the square root of 3

| clock | mul1 | mul2 | newton | add1 | add2 | add3 | control |
|---|---|---|---|---|---|---|---|
| 31 | rp + i | np + h = s | | | | | read rom for 1/15 = j |
| 32 | sp + j | rp + i = t | | | | | read rom for 1/13 = a |
| 33 | tp + a | sp + j = u | | | | | read rom for 1/11 = b |
| 34 | up + b | tp + a = v | | | | | read rom for 1/9 = c |
| 35 | vp + c | up + b = w | | | | | read rom for 1/7 = d |
| 36 | vp + d | vp + c = m | | | | | read rom for 1/5 = e |
| 37 | mp + e | wp + d = n | | | | | read rom for 1/3 = f |
| 38 | np + f | mp + e = r | | | | | |
| 39 | np + l | mp + f = s | | | | | |
| 40 | aq | mp + l = t | | | | | |
| 41 | |tx| | sq = a | | | | | |
| 42 | | |tx| = b | | | | | |
| 43 | | | | b − a | | | |
| 44 | | | | | b − a | | |
| 45 | | | | | | b − a => | output change siqn if x < 0 |

TABLE 2-7

Implementation of ArcTan(x) for 1/the square root of 3 < |x| < 1

| clock | mul1 | mul2 | newton | add1 | add2 | add3 | control |
|---|---|---|---|---|---|---|---|
| 1 | | | | | | | Represent 3**(1/2) as k and read rom for 1/k |
| 2 | | | | |x| − 1/k | | | read rom for k/2 |
| 3 | | | | | |x| − 1/k = y | | |
| 4 | | | | | | |x| − 1/k = y | |
| 5 | y*y | | | | | | |
| 6 | y*k/2 | y*y | | | | | read rom for 1/47 = a |
| 7 | y**3 | y*k/2 = L | | | | | read rom for 1/46 = b |
| 8 | y*y*k/2 | y**3 = p | | | | | read rom for 1/44 = c |
| 9 | ap + c | y*y*k/2 = q | | | | | read rom for 1/43 = d |
| 10 | bp + d | ap + c = r | | | | | read rom for 1/41 = e |
| 11 | rp + e | bp + d = s | | | | | read rom for 1/40 = f |
| 12 | sp + f | rp + e = t | | | | | read rom for 1/38 = g |
| 13 | tp + g | sp + f = u | | | | | read rom for 1/37 = h |
| 14 | up + h | tp + g = v | | | | | read rom for 1/35 = i |
| 15 | vp + i | up + h = w | | | | | read rom for 1/34 = j |
| 16 | wp + j | vp + i = m | | | | | read rom for 1/32 = a |
| 17 | mp + a | vp + j = n | | | | | read rom for 1/31 = b |
| 18 | np + b | mp + a = r | | | | | read rom for 1/29 = c |
| 19 | rp + c | np + b = s | | | | | read rom for 1/28 = d |
| 20 | sp + d | rp + c = t | | | | | read rom for 1/26 = e |
| 21 | tp + e | sp + d = u | | | | | read rom for 1/25 = f |
| 22 | up + f | tp + e = v | | | | | read rom for 1/23 = g |
| 23 | vp + g | up + f = w | | | | | read rom for 1/22 = h |
| 24 | wp + h | vp + g = m | | | | | read rom for 1/20 = i |
| 25 | mp + i | wp + h = n | | | | | read rom for 1/19 = j |
| 26 | np + j | mp + i = r | | | | | read rom for 1/17 = a |
| 27 | rp + a | np + j = s | | | | | read rom for 1/16 = b |
| 28 | sp + b | rp + a = r | | | | | read rom for 1/14 = c |
| 29 | tp + c | sp + b = u | | | | | read rom for 1/13 = d |
| 30 | up + d | tp + c = v | | | | | read rom for 1/11 = e |
| 31 | vp + e | up + d = w | | | | | read rom for 1/10 = f |
| 32 | wp + f | vp + e = m | | | | | read rom for 1/8 = g |
| 33 | mp + g | wp + f = n | | | | | read rom for 1/7 = h |
| 34 | np + h | mp + g = r | | | | | read rom for 1/5 = i |
| 35 | rp + i | np + h = s | | | | | read rom for 1/4 = j |
| 36 | ap + j | rp + i = t | | | | | read rom for 1/2 = a |
| 37 | tp + a | sp + j = u | | | | | |
| 38 | up + l | tp + a = v | | | | | |
| 39 | vq | up + l | | | | | |
| 40 | tL | vq = a | | | | | read rom for pi/6 |
| 41 | | tL = b | | pi/6 − a | | | |
| 42 | | | | | pi/6 − a | | |
| 43 | | | | | | pi/6 − a | |
| 44 | | | | b + pi/6 − a | | | |
| 45 | | | | | b + pi/6 − a | | |
| 46 | | | | | | b + pi/6 − a => | output, change sign if x < 0 |

TABLE 2-8

Implementation of lg(x) for 0 < x.

Express x as x = (2\*\*q) \* p where 11/16 < p < 23/16

| clock | mul1 | mul2 | newton | add1 | add2 | add3 | control |
|---|---|---|---|---|---|---|---|
| 1 | | | | determine p + 1 and q from x and represent 1/(p + 1) as z | | | |
| 2 | | | z(9) | | | | read rom for 2 |
| 3 | | | z(18) | (p + 1) − 2 | | | |
| 4 | | | z(36) | | (p + 1) − 2 | | read rom for 1/ln(2) = t |
| 5 | | | z(36) | float q | | (p + 1) − 2 = r | |
| 6 | | | z(66) | | float q | | |
| 7 | 2t | | z(66) | | | float q = s | |
| 8 | | 2t | z(66) | | | | |
| 9 | st | | z(66) | | | | |
| 10 | rz | st = v | | | | | |
| 11 | | | | | | | |
| 12 | h\*\*2 | | | | | | |
| 13 | 2th | h\*\*2 | | | | | read rom for 1/25 = a |
| 14 | h\*\*4 | 2th = o | | | | | read rom for 1/23 = b |
| 15 | h\*\*3 | h\*\*4 = r | | | | | read rom for 1/21 = c |
| 16 | ar + c | h\*\*3 = g | | | | | read rom for 1/19 = d |
| 17 | br + d | ar + c = i | | | | | read rom for 1/17 = e |
| 18 | ir + e | br + d = j | | | | | read rom for 1/15 = f |
| 19 | jr + f | ir + e = k | | | | | read rom for 1/13 = a |
| 20 | kr + a | jr + f = l | | | | | read rom for 1/11 = b |
| 21 | lr + b | kr + a = m | | | | | read rom for 1/9 = c |
| 22 | mr + c | lr + b = n | | | | | read rom for 1/7 = d |
| 23 | nr + d | mr + c = i | | | | | read rom for 1/5 = e |
| 24 | ir + e | nr + d = j | | | | | read rom for 1/3 = f |
| 25 | jr + f | ir + e = k | | | | | |
| 26 | kr + l | jr + f = l | | | | | |
| 27 | lg | kr + l = m | | | | | |
| 28 | mo | lg | | | | | |
| 29 | 2tlg | m0 = a | | | | | |
| 30 | | 2tlg = b | | a + v | | | |
| 31 | | | | | a + v | | |
| 32 | | | | | | a + v | |
| 33 | | | | b + a + v | | | |
| 34 | | | | | b + a + v | | |
| 35 | | | | | | b + a + v => output | |

TABLE 2-9

Implementation of lg(x + 1) for |x| < 1/4.

| clock | mul1 | mul2 | newton | add1 | add2 | add3 | control |
|---|---|---|---|---|---|---|---|
| 1 | x\*x | | | | | | read rom for 1/30 = a |
| 2 | | x\*x = p | | | | | read rom for 1/29 = b |
| 3 | | | | | | | read rom for 1/28 = c |
| 4 | ap + c | | | | | | read rom for 1/27 = d |
| 5 | bp + d | ap + c = i | | | | | read rom for 1/26 = e |
| 6 | ip + e | bp + d = j | | | | | read rom for 1/25 = f |
| 7 | jp + f | ip + e = k | | | | | read rom for 1/24 = a |
| 8 | kp + a | jp + f = l | | | | | read rom for 1/23 = b |
| 9 | lp + b | kp + a = m | | | | | read rom for 1/22 = c |
| 10 | mp + c | lp + b = n | | | | | read rom for 1/21 = d |
| 11 | np + d | mp + c = i | | | | | read rom for 1/20 = e |
| 12 | ip + e | np + d = j | | | | | read rom for 1/19 = f |
| 13 | jp + f | ip + e = k | | | | | read rom for 1/18 = a |
| 14 | kp + a | jp + f = l | | | | | read rom for 1/17 = b |
| 15 | lp + b | kp + a = m | | | | | read rom for 1/16 = c |
| 16 | mp + c | lp + b = a | | | | | read rom for 1/15 = d |
| 17 | np + d | mp + c = i | | | | | read rom for 1/14 = e |
| 18 | ip + e | np + d = j | | | | | read rom for 1/13 = f |
| 19 | jp + f | ip + e = k | | | | | read rom for 1/12 = a |
| 20 | kp + a | jp + f = l | | | | | read rom for 1/11 = b |
| 21 | lp + b | kp + a = m | | | | | read rom for 1/10 = c |
| 22 | mp + c | lp + b = n | | | | | read rom for 1/9 = d |
| 23 | np + d | mp + c = i | | | | | read rom for 1/8 = e |
| 24 | ip + e | np + d = j | | | | | read rom for 1/7 = f |
| 25 | jp + f | ip + e = k | | | | | read rom for 1/6 = a |
| 26 | kp + a | jp + f = l | | | | | read rom for 1/5 = b |

| | | | |
|---|---|---|---|
| 27 | lp + b | kp + a = m | read rom for 1/4 = c |
| 28 | mp + c | lp + b = n | read rom for 1/3 = d |
| 29 | np + d | mp + c = i | read rom for 1/2 = e |
| 30 | ip + e | np + d = j | |
| 31 | jp + l | ip + e = k | |
| 32 | kp | jp + l = l | |
| 33 | lx | jp = m | read rom for 1/ln(2) = z |
| 34 | mz | lx = n | |
| 35 | nz | mx = a | |
| 36 | | nz = b | |
| 37 | | | b − a |
| 38 | | | b − a |
| 39 | | | b − a => output |

TABLE 2-10

Implementation of lg(x + 1) for 1/4 < |x|.

Express x + 1 as x + 1 = (2**q) * p where 11/16 < p < 23/16

| clock | mul1 | mul2 | newton | add1 | add2 | add3 | control |
|---|---|---|---|---|---|---|---|
| 1 | | | | x + 1 | | | |
| 2 | | | | | x + 1 | | |
| 3 | | | | | | x + 1 = x | [new x is old x plus one] |
| 4 | | | determine p + 1 and q from new x | Represent 1/(p + 1) as z | | | |
| 5 | | | z(9) | | | | read rom for 2 |
| 6 | | | z(17) | | | | |
| 7 | | | z(33) | | | | read rom for 1/ln(2) = t |
| 8 | | | z(33) | float q | | | |
| 9 | | | z(66) | | float q | | |
| 10 | 2t | | z(66) | | | float q = s | |
| 11 | | 2t | z(66) | | | | |
| 12 | st | | z(66) | | | | |
| 13 | xz | st = v | | | | | |
| 14 | | xz = h | | | | | |
| 15 | h**2 | | | | | | |
| 16 | 2th | h**2 | | | | | read rom for 1/25 = a |
| 17 | h**4 | 2th = o | | | | | read rom for 1/23 = b |
| 18 | h3 | h4 = r | | | | | read rom for 1/21 = c |
| 19 | ar + c | h**3 = g | | | | | read rom for 1/19 = d |
| 20 | br + d | ar + c = i | | | | | read rom for 1/17 = e |
| 21 | ir + e | br + d = j | | | | | read rom for 1/15 = f |
| 22 | jr + f | ir + e = k | | | | | read rom for 1/13 = a |
| 23 | kr + a | jr + f = l | | | | | read rom for 1/11 = b |
| 24 | lr + b | kr + a = m | | | | | read rom for 1/9 = c |
| 25 | mr + c | lr + b = n | | | | | read rom for 1/7 = d |
| 26 | nr + d | mr + c = i | | | | | read rom for 1/5 = e |
| 27 | ir + e | nr + d = j | | | | | read rom for 1/3 = f |
| 28 | jr + f | ir + e = k | | | | | |
| 29 | kr + l | jr + f = l | | | | | |
| 30 | lq | kr + l = m | | | | | |
| 31 | mo | lg | | | | | |
| 32 | 21g | m0 = a | | | | | |
| 33 | | 21g = b | | a + v | | | |
| 34 | | | | | a + v | | |
| 35 | | | | | | a + v | |
| 36 | | | | b + a + v | | | |
| 37 | | | | | b + a + v | | |
| 38 | | | | | | b + a + v => output | |

I claim:

1. A system for computing transcendental functions quickly, comprising a multiply-add element for multiplication and addition, said multiply-add element having inputs for a pair of multiplicands and for an addend, having an output, said multiply-add element being disposed to operate to compute a product of said multiplicands summed with said addend without a rounding operation, and said multiply-add element having at least two pipeline stages wherein a first said pipeline stage of said multiply-add element comprises a carry save adder circuit; and wherein a second said pipeline stage of said multiply-add element comprises a carry look ahead adder circuit;

a memory disposed for storing a first subsequence of terms and a second subsequence of terms for a convergent series;

first means for reading said first subsequence of terms from said memory and for inputting a set of operands representing said first subsequence of terms to said multiply-add element, so that said multiply-add element operates to determine a first subtotal for said convergent series;

second means for reading said second subsequence of terms from said memory and for inputting a set of operands representing said second subsequence of terms to said multiply-add element, so that said multiply-add element operates to determine a second subtotal for said convergent series in parallel with said first subtotal; and an adder circuit means for combining said first subtotal and said second subtotal.

2. A system as in claim 1, wherein said transcendental function includes a function for SIN, COS, TAN, SINH, COSH, TANH, EXP, or ARCTAN.

3. A system as in claim 1, comprising an inverting element disposed for accepting one said output of said multiply-add element and for determining a multiplicative inverse of said invertable operand.

4. A system as in claim 1, comprising an input register disposed for storing an operand for said transcendental function;

a comparator disposed for comparing a value stored in said input register with a selected constant value; and means responsive to an output of said comparator for selecting a series for determining a value for said transcendental function.

* * * * *